(12) United States Patent
Wong et al.

(10) Patent No.: US 9,070,006 B2
(45) Date of Patent: Jun. 30, 2015

(54) METHOD AND SYSTEM FOR PROCESSING AN IMAGE OF A BIOLOGICAL SPECIMEN

(75) Inventors: Kam Lin Wong, Bedford, MA (US); David Zahniser, Wellesley, MA (US); Kathy Mui, Chelmsford, MA (US); Jim Linder, Omaha, NE (US); Ellen Sheets, Concord, MA (US)

(73) Assignee: Hologic, Inc., Marlborough, MA (US)

( * ) Notice: Subject to any disclaimer, the term of this patent is extended or adjusted under 35 U.S.C. 154(b) by 2327 days.

(21) Appl. No.: 11/957,084

(22) Filed: Dec. 14, 2007

(65) Prior Publication Data

US 2008/0144915 A1 Jun. 19, 2008

Related U.S. Application Data

(60) Provisional application No. 60/870,838, filed on Dec. 19, 2006.

(51) Int. Cl.
*G06K 9/00* (2006.01)
*G06T 7/00* (2006.01)
*G06T 7/40* (2006.01)

(52) U.S. Cl.
CPC .......... *G06K 9/00147* (2013.01); *G06T 7/0012* (2013.01); *G06T 7/402* (2013.01); *G06T 2207/10056* (2013.01); *G06T 2207/30024* (2013.01)

(58) Field of Classification Search
USPC ....................................................... 382/128
See application file for complete search history.

(56) References Cited

U.S. PATENT DOCUMENTS

| | | | | |
|---|---|---|---|---|
| 5,848,177 A * | 12/1998 | Bauer et al. | | 382/128 |
| 5,991,028 A * | 11/1999 | Cabib et al. | | 356/456 |
| 6,026,174 A * | 2/2000 | Palcic et al. | | 382/133 |
| 6,215,892 B1 * | 4/2001 | Douglass et al. | | 382/128 |
| 7,415,148 B2 * | 8/2008 | Wrigglesworth et al. | | 382/133 |
| 2005/0009032 A1 | 1/2005 | Coleman et al. | | |
| 2005/0036667 A1* | 2/2005 | So et al. | | 382/128 |
| 2005/0037406 A1* | 2/2005 | De La Torre-Bueno et al. | | 435/6 |
| 2005/0165290 A1* | 7/2005 | Kotsianti et al. | | 600/407 |
| 2005/0265588 A1* | 12/2005 | Gholap et al. | | 382/128 |
| 2006/0064248 A1 | 3/2006 | Saidi et al. | | |
| 2006/0245630 A1 | 11/2006 | Zahniser et al. | | |
| 2009/0258345 A1* | 10/2009 | Lee et al. | | 435/6 |

OTHER PUBLICATIONS

Duggan, et al., "ERCP-directed brush cytology prepared by the Thinprep method: test performance and morphology of 149 cases", Cytopathology, vol. 15, No. 2, Mar. 25, 2004, Blackwell Publishing Ltd., pp. 80-86 (7 pages).
PCT International Search Report and Written Opinion for PCT/US2007/087620, Applicant Cytyc Corporation, Forms PCT/ISA/210, 220, and 237 dated Aug. 12, 2009 (15 pages).

* cited by examiner

*Primary Examiner* — Michael Logie
*Assistant Examiner* — Jason McCormack
(74) *Attorney, Agent, or Firm* — Vista IP Law Group LLP

(57) ABSTRACT

Components, e.g., background, cytoplasm, nucleus and nucleolus, of a biological specimen are identified using multi-wavelength analysis. Specimen components, such as nucleoli, are selected, and a determination is made whether cells having nucleoli are cancer cells or regular repair cells based on one or more physical characteristics of the identified component. The physical characteristics can be one or more of a shape, size, texture and gray value.

12 Claims, 15 Drawing Sheets

FIG. 10
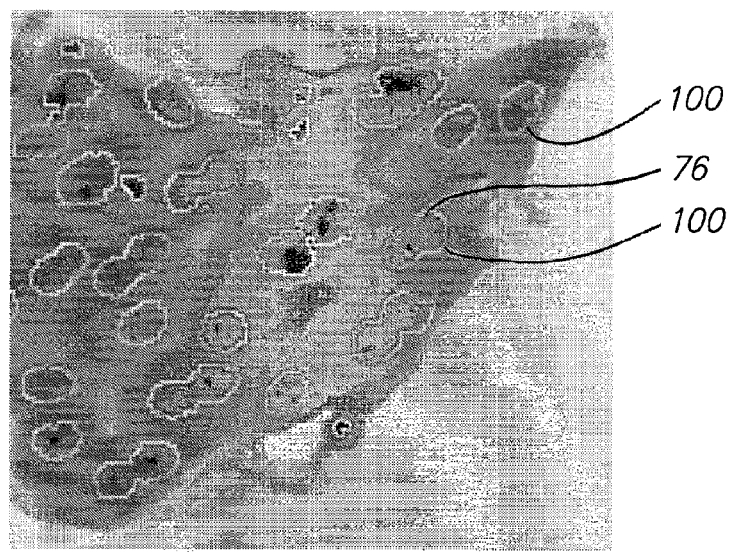
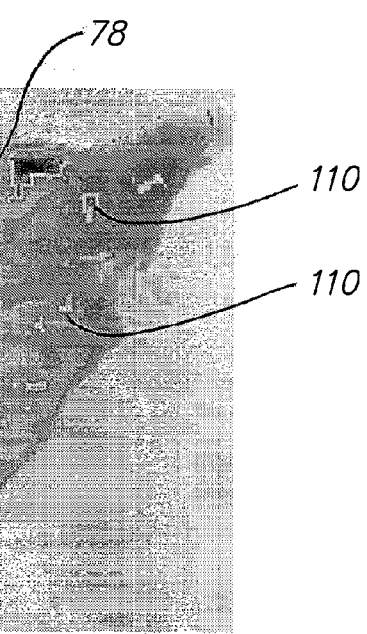
FIG. 11

| Wavelength | Transmission Through Nucleus of Cancer Cell 180 | Transmission Through Nucleus of Repair Cell 182 |
|---|---|---|
| λ1 | Grey Value (Cancer) at λ1 | Grey Value (Repair) at λ1 |
| λ2 | Grey Value (Cancer) at λ2 | Grey Value (Repair) at λ2 |
| λ3 | Grey Value (Cancer) at λ3 | Grey Value (Repair) at λ3 |
| λ4 | Grey Value (Cancer) at λ4 | Grey Value (Repair) at λ4 |
| λ5 | Grey Value (Cancer) at λ5 | Grey Value (Repair) at λ5 |
| λ6 | Grey Value (Cancer) at λ6 | Grey Value (Repair) at λ6 |
| λ7 | Grey Value (Cancer) at λ7 | Grey Value (Repair) at λ7 |
| λ8 | Grey Value (Cancer) at λ8 | Grey Value (Repair) at λ8 |
| λ9 | Grey Value (Cancer) at λ9 | Grey Value (Repair) at λ9 |
| λ10 | Grey Value (Cancer) at λ10 | Grey Value (Repair) at λ10 |
| λn | Grey Value (Cancer) at λn | Grey Value (Repair) at λn |

FIG. 18

| Wavelength | Transmission Through Nucleus of Cancer Cell 180 | Transmission Through Nucleus of Repair Cell 182 | Transmission Through Nucleus of Cell / Region 200 | Match/Similar 202 |
|---|---|---|---|---|
| $\lambda 1$ | Grey Value (Cancer) at $\lambda 1$ | Grey Value (Repair) at $\lambda 1$ | Grey Value at $\lambda 1$ | |
| $\lambda 2$ | Grey Value (Cancer) at $\lambda 2$ | Grey Value (Repair) at $\lambda 2$ | Grey Value at $\lambda 2$ | Repair |
| $\lambda 3$ | Grey Value (Cancer) at $\lambda 3$ | Grey Value (Repair) at $\lambda 3$ | Grey Value at $\lambda 3$ | Repair; Cancer |
| $\lambda 4$ | Grey Value (Cancer) at $\lambda 4$ | Grey Value (Repair) at $\lambda 4$ | Grey Value at $\lambda 4$ | |
| $\lambda 5$ | Grey Value (Cancer) at $\lambda 5$ | Grey Value (Repair) at $\lambda 5$ | Grey Value at $\lambda 5$ | |
| $\lambda 6$ | Grey Value (Cancer) at $\lambda 6$ | Grey Value (Repair) at $\lambda 6$ | Grey Value at $\lambda 6$ | Repair |
| $\lambda 7$ | Grey Value (Cancer) at $\lambda 7$ | Grey Value (Repair) at $\lambda 7$ | Grey Value at $\lambda 7$ | Repair |
| $\lambda 8$ | Grey Value (Cancer) at $\lambda 8$ | Grey Value (Repair) at $\lambda 8$ | Grey Value at $\lambda 8$ | Repair |
| $\lambda 9$ | Grey Value (Cancer) at $\lambda 9$ | Grey Value (Repair) at $\lambda 9$ | Grey Value at $\lambda 9$ | Repair |
| $\lambda 10$ | Grey Value (Cancer) at $\lambda 10$ | Grey Value (Repair) at $\lambda 10$ | Grey Value at $\lambda 10$ | |
| $\lambda n$ | Grey Value (Cancer) at $\lambda n$ | Grey Value (Repair) at $\lambda n$ | Grey Value at $\lambda n$ | |

FIG. 20

| Wavelength (nm) | Transmission Through Nucleus of Cancer Cell 180 | Transmission Through Nucleus of Repair Cell 182 | Optical Density of Pixels in Cancer Nucleus 210 | Optical 212 |
|---|---|---|---|---|
| 420 | Grey Value (Cancer) at 420 | Grey Value (Repair) at 420 | Optical Density (Cancer) at 420 | Optical Density (Repair) at 420 |
| 430 | Grey Value (Cancer) at 430 | Grey Value (Repair) at 430 | Optical Density (Cancer) at 430 | Optical Density (Repair) at 430 |
| 440 | Grey Value (Cancer) at 440 | Grey Value (Repair) at 440 | Optical Density (Cancer) at 440 | Optical Density (Repair) at 440 |
| 450 | Grey Value (Cancer) at 450 | Grey Value (Repair) at 450 | Optical Density (Cancer) at 450 | Optical Density (Repair) at 450 |
| 460 | Grey Value (Cancer) at 460 | Grey Value (Repair) at 460 | Optical Density (Cancer) at 460 | Optical Density (Repair) at 460 |
| 470 | Grey Value (Cancer) at 470 | Grey Value (Repair) at 470 | Optical Density (Cancer) at 470 | Optical Density (Repair) at 470 |
| 480 | Grey Value (Cancer) at 480 | Grey Value (Repair) at 480 | Optical Density (Cancer) at 480 | Optical Density (Repair) at 480 |
| 490 | Grey Value (Cancer) at 490 | Grey Value (Repair) at 490 | Optical Density (Cancer) at 490 | Optical Density (Repair) at 490 |
| ... | | | | |
| 710 | Grey Value (Cancer) at 710 | Grey Value (Repair) at 710 | Optical Density (Cancer) at 710 | Optical Density (Repair) at 710 |
| 720 | Grey Value (Cancer) at 720 | Grey Value (Repair) at 720 | Optical Density (Cancer) at 720 | Optical Density (Repair) at 720 |

METHOD AND SYSTEM FOR PROCESSING AN IMAGE OF A BIOLOGICAL SPECIMEN

RELATED APPLICATION DATA

The present application claims the benefit under 35 U.S.C. §119 to U.S. provisional patent application Ser. No. 60/870,838, filed Dec. 19, 2006. The foregoing application is hereby incorporated by reference into the present application in its entirety.

FIELD OF INVENTION

The invention relates to imaging and analysis of biological specimens, and more particularly, to reducing the number of non-cancerous repair cells that are selected by an imaging system for subsequent review.

BACKGROUND

Medical professionals and cytotechnologists frequently review biological specimens affixed to a specimen carrier, such as a slide, to analyze whether a person from whom the specimen was obtained has or may have a particular medical condition. For example, it is well known to examine a cytological specimen in order to detect the presence of malignant or pre-malignant cells as part of a Papanicolaou (Pap) smear test. To facilitate this review process, automated systems have been employed to perform a pre-screening of the specimen slides in order to focus the cytotechnologist's attention on the most (or at least more) pertinent cells or groups of cells in the respective specimen, while discarding less relevant cells from further review. One such automated imaging system is the Thinprep Imaging System, available from Cytyc Corporation, 250 Campus Drive, Marlborough, Mass. 01752 (www.cytyc.com).

FIG. 1 generally illustrates a known imaging system 10 that includes a processor, computer or controller 11, an optical stack 12 and a robot for feeding and removing specimen slides 14 to and from the optical stack 12. An optical stack 12 includes a motion control board computer or controller 20, a stage 21, a light source 22, a lens 23 and a camera 24. Images generated by the optical stack 12 are provided to the computer 11 for analysis. The robot 13 takes a slide 14 from a cassette 30 and places the slide 14 on the stage 21. The computer 11 controls the MCB computer 20 so that the MCB computer 20 moves the stage 21 to location the slide 14 under the camera 24 and the lens 23. The light source 22 is activated, and an image of a portion of the specimen on the slide 14 is acquired by the camera 24 and provided to the computer 11. The computer 11 instructs the MCB computer 20 to move the stage 21 and the slide 14 thereon a very short distance from a first location to a second location. An image of the next portion of the specimen on the slide 14 at the second location is acquired by the camera 24 and provided to the computer 11.

The stage 21 is moved to a different location after an image is taken of different portions of the specimen on the slide 14. A first portion of the specimen is imaged when the stage 21 is at a first stage location. The stage 21 is moved to a second location, and an image of a second portion of the specimen is acquired at the second location. The stage 21 is moved to a third location, and an image of the third portion of the specimen is acquired, and so on for each portion of the specimen until the entire specimen is imaged. In known imaging systems, the stage 21 can be moved about 2,400 times to acquire 2,400 images of 2,400 different portions of a specimen. The robot 13 then removes the imaged slide 14 from the stage 21 and places another slide 14 from the cassette 30 onto the stage 21 for imaging as described above.

After images of the specimen are acquired, the images are processed to identify or rank cells and cell clusters that are of diagnostic interest. In some systems, this includes identifying those cells that most likely have attributes consistent with malignant or pre-malignant cells and their locations (x-y coordinates) on the slide. For example, the processor 11 may select about 20 fields of view, e.g., 22 fields of view, which include x-y coordinates identifying the locations of cells and cell clusters that were selected by the processor 11. This field of view or coordinate information is provided to the microscope (not shown in FIG. 1), which steps through the identified x-y coordinates, placing the cells or clusters of cells within the field of view of the technician. While current imaging systems and methods for selecting portions of images for further review have been used effectively in the past, they can be improved.

For example, referring to FIG. 2, if the cells are consistent with pre-malignant cells or malignant or cancerous cells 42 (generally identified by "C"), then the selected fields of view 40 ideally identify these cells or regions so that the cytotechnologist is directed to those cells or clusters during review. Although FIG. 2 illustrates each field of view 40 having cancerous cells, it should be understood that some fields of view have regular cells, whereas other fields of view have non-cancerous cells, but the processor 11 is configured to identify cells or regions 42 that are most consistent with pre-malignant and malignant or cancerous cells.

Referring to FIG. 3, in some cases, however, there may be normal, non-cancerous cells, e.g., repair cells 44 (identified by "R"), which are normally dividing cells that are generated to replace or repair damaged tissue. These repair cells 44 may appear similar to pre-malignant or malignant cells 42 that would otherwise be selected by the processor 11 since repair cells 44 and cancerous cells 42 both include dividing nucleus components. Consequently, normal repair cells 44 may result in "false alarms" in that they may be ranked higher than other malignant or pre-malignant cells 42 that would otherwise be selected by a processor 11 if the false alarm cells were not selected. Thus, when repair cells 44 are analyzed, the processor 11 may select fields of view that include higher ranking non-cancerous cells instead of other fields of view that include more relevant cells (possibly cancerous cells). The fields of view that should have been selected are generally illustrated by dotted lines in FIG. 3. Thus, the cytotechnologist may not be presented with the most relevant fields of view, possibly resulting in a less accurate diagnosis.

SUMMARY OF THE INVENTION

In one embodiment, a method of processing an image of a biological specimen having a plurality of cells includes identifying components of the biological specimen based on spectral characteristics of the components, selecting an identified component, and determining whether cells having the selected component have a likelihood of being cancerous or non-cancerous based on one or more physical characteristics of the identified component. By way of non-limiting examples, the identified components of the specimen may include one or more of background, cytoplasm and nuclear (e.g., nucleolus) components of the specimen. By way of further non-limiting examples, the components of the specimen may be identified using one or more light wavelengths in a range from about 400 nm to about 720 nm. The components may be identified by classifying a pixel of the image as a certain component of the biological specimen based on spectral characteristics of the pixel. The method may optionally further include determining whether cells corresponding to the selected components are cancer cells or normal repair cells. The determination of whether cells having the selected component have a likelihood of being cancerous or non-cancerous may be based on one or more of a shape, a texture or a size of the identified component. Additionally or alternatively, the determination of whether cells having the selected component have a likelihood of being cancerous or non-cancerous may be based on a transmittance or gray value of the identified component or of an image pixel of the identified component.

In another embodiment, a method of processing an image of a biological specimen having a plurality of cells includes identifying components of the biological specimen based on spectral characteristics of the components, the identified components including nucleus components. The method further includes selecting regions of the image having nucleus components having one or more nucleolus components, and determining whether cells in the selected regions are cancer cells or repair cells based on one or more physical characteristics of the nucleolus components. Again, the determination of whether cells in the selected regions are cancer cells or repair cells may be based on one or more of a shape, a size, a texture and a transmittance of the nucleolus components.

In still another embodiment, a method of processing an image of a biological specimen having a plurality of cells includes selecting a field of view from a plurality of fields of view of the image, selecting a field of view, classifying pixels of selected field of view as background, cytoplasm, nucleus or nucleolus components based on spectral characteristics of the pixels, selecting pixel regions of the selected field of view that correspond to nucleolus components, and determining whether cells in the selected pixel regions are cancer cells or repair cells based on one or more physical characteristics of the nucleolus components. The physical components may include one or more of a shape, a size, a texture and a transmittance of the nucleolus components.

In yet another embodiment, a system for processing an image of a biological specimen having a plurality of cells includes, an imager having a processor configured to identify components of the biological specimen based on spectral characteristics of the components, select an identified component, and determine whether cells in the image having the selected component are cancerous or non-cancerous based on one or more physical characteristics of the identified component. The processor may identify components of the specimen based on identifying one or more of background, cytoplasm and nuclear (e.g., nucleolus) components of the specimen. The components of the specimen may be identified using one or more light wavelengths in a range from about 400 nm to about 720 nm, wherein the system preferably includes a light source or light sources of the one or more light wavelengths, and wherein the processor identifies components of the specimen based on classifying a pixel of the image as a certain component of the biological specimen based on spectral characteristics of the pixel. The processor may be further configured to determine whether cells corresponding to the selected components are cancer cells or normal repair cells based on one or more of a shape, a texture, a size and a transmittance of the identified component.

BRIEF DESCRIPTION OF THE DRAWINGS

Referring now to the drawings in which like reference numbers represent corresponding parts throughout and in which:

FIG. 10 generally illustrates segmentation or selection of nucleus components;

FIG. 11 generally illustrates segmentation or selection of nucleolus components;

FIG. 18 illustrates transmission profiles of gray values of cancer and repair cells;

FIG. 20 is a chart comparing light intensity and optical density of pixels digitized by using different wavelength of light to transmission profiles of cancer and repair cells according to one embodiment;

FIG. 21 illustrates transmission and optical density profiles of cancer and repair cells.

DETAILED DESCRIPTION OF ILLUSTRATED EMBODIMENTS

Figure 4:
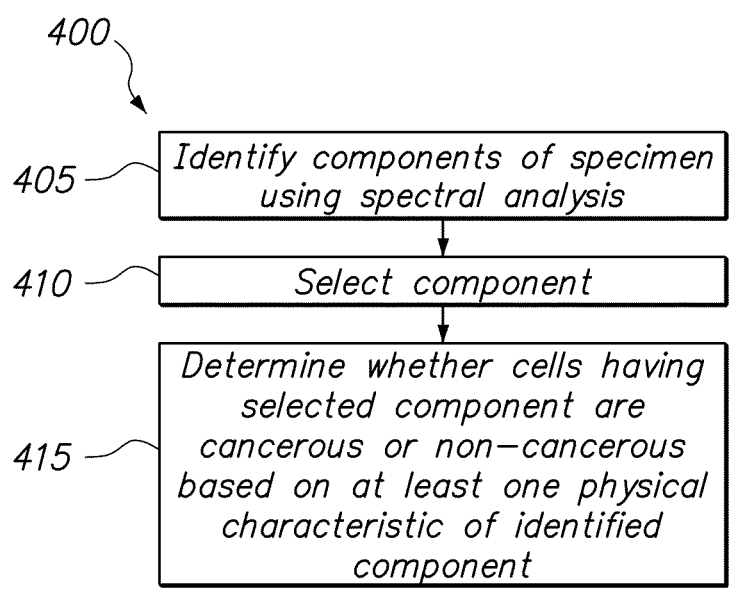
FIG. 4 is a flow chart of a method of processing images of a biological specimen involving analysis of spectral and physical characteristics according to one embodiment.

Referring to FIG. 4, according to one embodiment of the invention, a method 400 of processing an image of a biological specimen, e.g. a cytological specimen, includes identifying components of the specimen using spectral analysis in step 405. After components are identified, in step 410, one of the components is selected. For example, the selected component may be a nucleolus of a nucleus. Then, in step 415, a determination is made whether cells that include the selected component are cancerous or non-cancerous based on one or more physical characteristics of the component.

Figure 5:
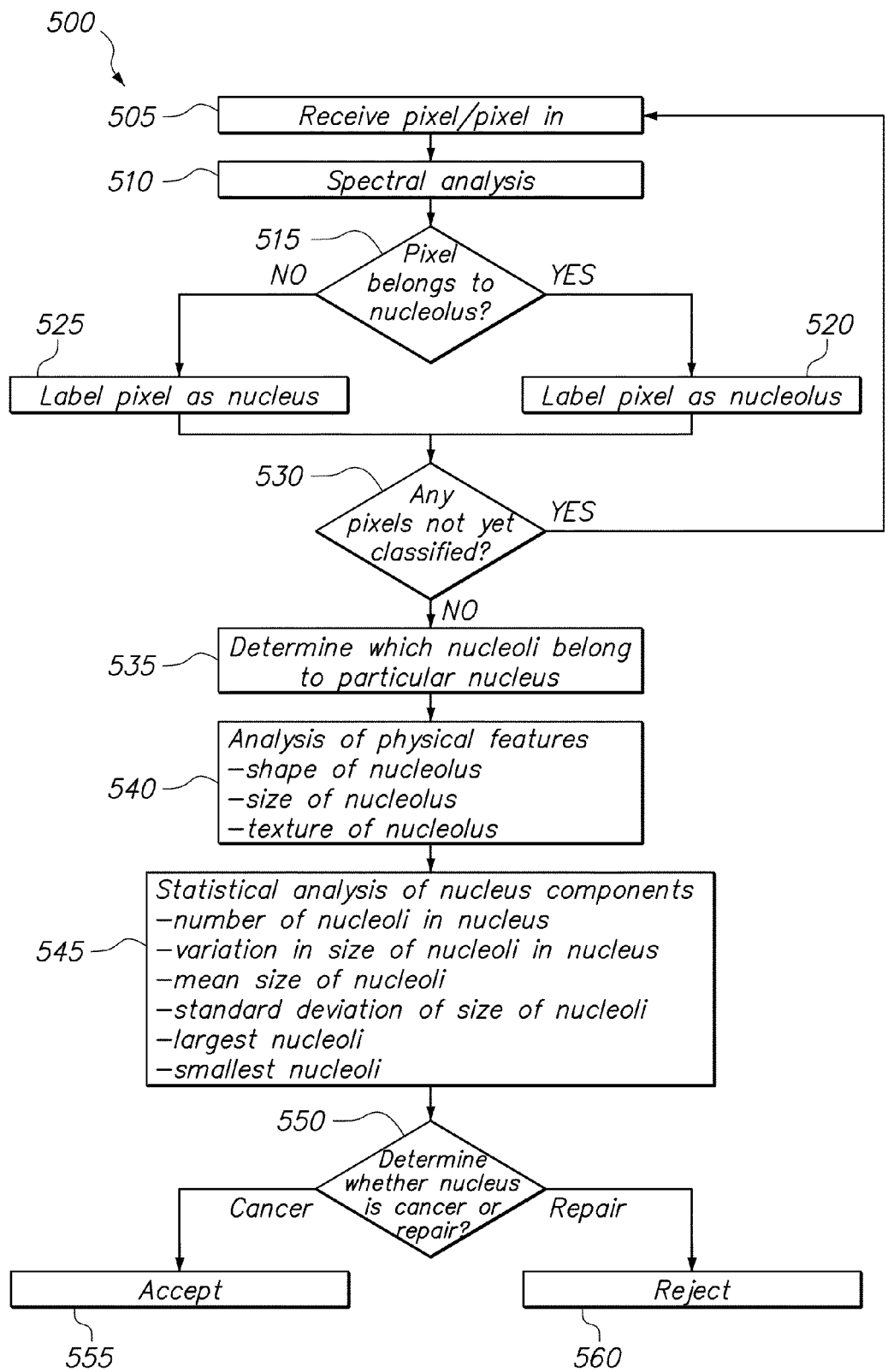
FIG. 5 is a more detailed flow chart of a method of processing images of a biological specimen involving analysis of spectral and physical characteristics according to one embodiment.

Referring to FIG. 5, a method 500 of processing an image of a biological specimen includes receiving a pixel that is to be imaged in step 505. In step 510, spectral analysis is performed to determine whether a pixel is background, cytoplasm, nucleus or nucleolus. For purposes of explanation and illustration, reference is made to nucleus and nucleolus components since background and cytoplasm components can be disregarded for purposes of this analysis.

Continuing with step 515, a determination is made whether the pixel belongs to a nucleolus. If it is determined that the pixel belongs to a nucleolus, then the pixel is labeled as such in step 520. Otherwise, if it is determined that the pixel does not belong to a nucleolus, then the pixel belongs to a nucleus and is labeled as such in step 525.

In step 530, a determination is made whether any additional pixels of the image should be classified. If so, then additional pixels are classified beginning with step 505 until the entire image is processed. Otherwise, after all of the pixels classified, e.g., as either part of a nucleolus or a nucleus, then in step 535, a determination is made as to which nucleolus components or nucleoli belong to which nucleus.

In step 540, physical features of nucleolus components can be analyzed, e.g., the shape, size and texture of the nucleolus. Additionally, if necessary, in step 545, a statistical analysis of nucleus components can be performed. Step 550 may involve, for example, the number of nucleolus components within a nucleus, whether the size of nucleolus components varies and if so, by how much, the mean size of nucleoli, standard deviation of sizes of nucleoli, the largest nucleoli and the smallest nucleoli, probabilities, weighted probabilities and other suitable statistical functions.

Following analysis of physical characteristics (step 545) and statistical analysis, in step 555 a determination is made whether a given nucleus is cancerous or non-cancerous (e.g. a repair cell). Step 555 can be performed using, for example, linear discriminant analysis, Bayesian Network, hierarchical trees. This analysis can determine which physical characteristic and/or statistical variables are the best predictors to classify a nucleus as a cancer cell or a repair cell.

For example, in some embodiments, training data can be acquired to determine size, shape and texture data for cancer and repair cell samples. After the training data is acquired, a covariance matrix and linear discriminant analysis can be computed to indicate how significant a physical and/or statistical feature is to identify a nucleus as part of a cancer cell or a normal repair cell. The linear discriminant function is used to compute a predictor or value that allows for classification of new physical characteristic data from cells that are being examined/reviewed.

Following acquisition and processing of the preliminary training data and derivation of the linear discriminant function, actual physical characteristic data (step 545) of incoming pixels (step 505) can be analyzed to determine, in step 555, whether a given nucleus is cancerous or non-cancerous based on the previously acquired training data. For example, physical characteristic data that is acquired during step 545 can be input into the previously derived linear discriminant function. Fitting the data into a linear discriminant function that represents the repair class provides a Repair Score (RS).

By fitting the data into a linear discriminant function that represents the cancer class provides a Cancer Score (CS). If CS is greater than RS, then it can be determined that the nucleus belongs to the cancer class and vice versa. This analysis also involves computing the Mahalanobis Distance and determining the shortest distance of the features from their group means to indicate whether a given nucleus is more likely part of a repair cell or a cancer cell. Persons skilled in the art will appreciate that various other functions and analyses can be utilized to determine whether a given nucleus is part of a cancer or repair cell. Thus, the exemplary functions described above are provided for purposes of explanation in a non-limiting manner.

In step 555, if it is determined that the nucleus belongs to a cancer cell, the pixel or pixels comprising the nucleus can be accepted for further review. Otherwise, in step 560, the repair cell nucleus can be rejected if it is determined that the nucleus belongs to a normally dividing repair cell so that the normal cell is not selected for further review. Further aspects of spectral analysis to identify cellular components and analysis of physical nucleoli characteristics and/or nuclear statistical characteristics to determine whether a given nucleus is part of a cancer or repair cell are explained with reference to FIGS. 6-14.

Figure 6:
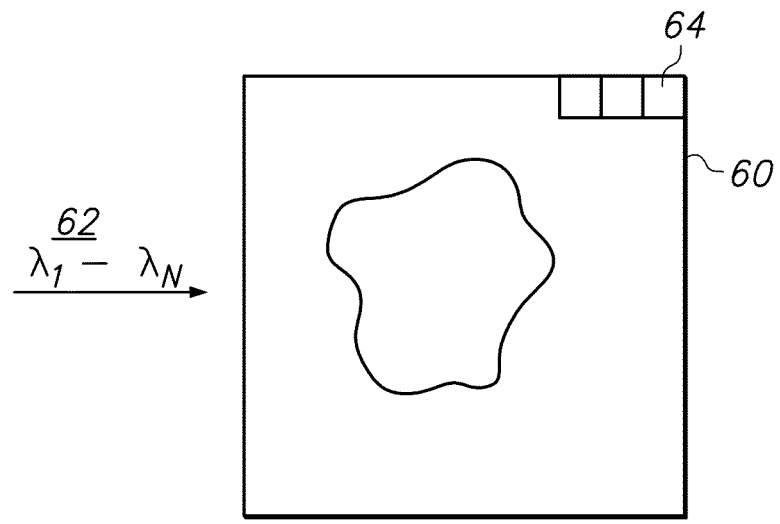
FIG. 6 generally illustrates spectral analysis of a portion or region of a biological specimen.

Referring to FIG. 6, spectral analysis involves exposing a portion 60 of the image to different wavelengths 62 of light (generally represented by $\lambda 1$-$\lambda n$). According to one embodiment, the range of wavelengths used during spectral analysis 62 of the specimen can be from about 400 nm to about 720 nm, e.g., in 10 nm increments. Spectral analysis can involve, for example, about three to about 30 wavelengths.

Persons skilled in the art will appreciate that different ranges of wavelengths, numbers of wavelengths and wavelength increments can be utilized. The portion 60 can also be various shapes and sizes and include one or more cells. For example, the portion 60 can be a selected field of view. For purposes of illustration and explanation, the selected portion 60 is shown as having a square shape and comprised of one or more pixels 64.

Figure 7:
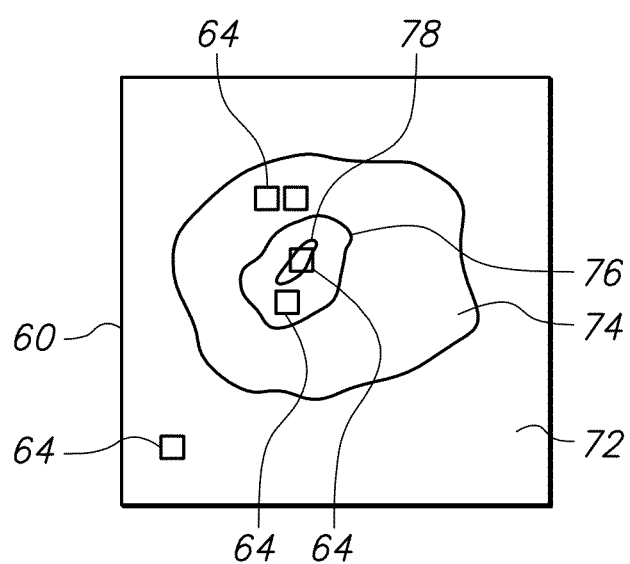
FIG. 7 generally illustrates identifying components of a portion or region of a biological specimen as a result of spectral analysis.

Referring to FIG. 7, different components of the specimen portion 60 are identified or classified as a result of multiwavelength spectral analysis 62. In the illustrated embodiment, pixels 70 of the image of the portion 60 (pixels 64 of the image) are classified as background 72, cytoplasm 74 and a nucleus 76, which includes smaller nucleolus 78 components. A nucleolus 78 is a generally round or oval and dense body that includes DNA and RNA. Embodiments advantageously utilize multiple wavelengths 62 to identify the various specimen components and to allow nucleoli 78 to become more visible and distinguishable compared to images produced by known imaging systems. The results and advantages of embodiments that utilize spectral analysis 62 are further illustrated by comparing FIGS. 8 and 9.

Figure 8:
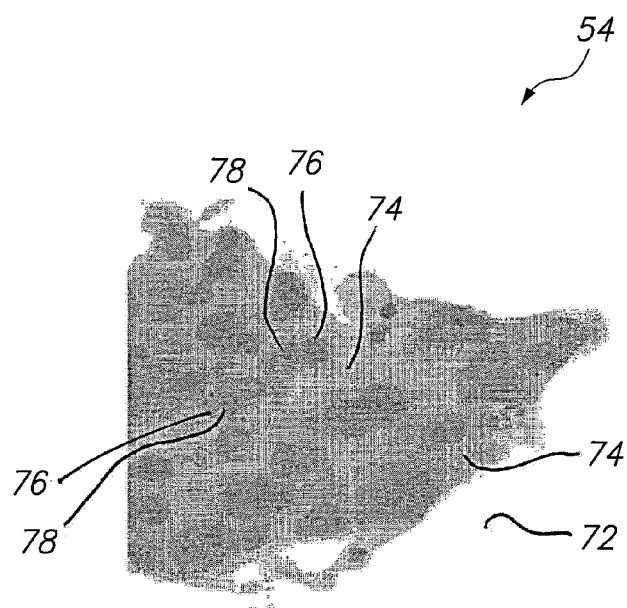
FIG. 8 is an image obtained using spectral analysis and showing components of a normal repair cell cluster.
Figure 9:
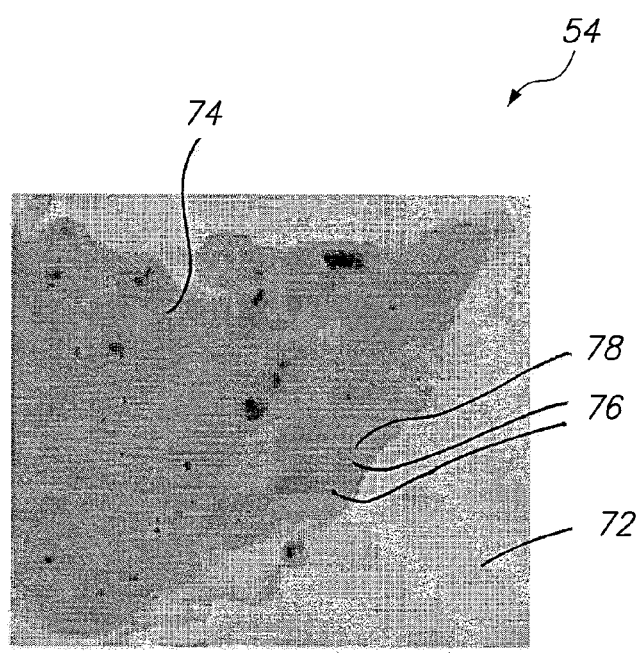
FIG. 9 is a gray scale image showing components of a normal repair cell cluster in less detail than the image shown in FIG. 7.

Referring to FIG. 8, multi-wavelength spectral analysis 62 allows chromatin details and nucleoli 78 to be clearly visible within the nucleus 76. For purposes of comparison, FIG. 9 is a gray scale image which shows nucleus 76, nucleolus 78 and cytoplasm 74 components, but these components are clearly less distinctive and less visible compared to the nucleus 76, nucleolus 78 and cytoplasm 74 components shown in FIG. 8 generated with multiple wavelengths 62. Thus, embodiments use multi-wavelength spectral analysis 62 to advantageously identify different components, including nucleoli 78 components, with enhanced visibility and detail compared to gray scale images.

Referring to FIGS. 10 and 11, pixels 64 corresponding to selected components of the specimen can be segmented 100 or separated from other components after pixels 64 are identified or classified using spectral analysis 62. For example, referring to FIG. 10, nucleus 76 components can be segmented 100 based on the components identified as shown in FIG. 8. FIG. 10 shows nucleus 76 components being enclosed by a light gray border. Further, referring to FIG. 9, nucleolus 78 components can be segmented 110 based on the identified components shown in FIG. 8. FIG. 11 shows nucleoli 78 components that are enclosed by a light gray border.

Physical characteristics of the nuclear components can be analyzed to determine whether the cells of the pixels 64 are cancerous or non-cancerous after the nuclear component pixels 64 are identified or segmented. For example, according to one embodiment, nucleoli 78 components are identified, and one or more physical characteristics of the nucleoli 78 are analyzed to determine whether the corresponding cells are non-cancerous repair cells 44 or cancerous cells 42.

According to one embodiment, a physical characteristic of the nucleoli 78 that is used to identify repair cells 44 and distinguish repair cells 44 from cancerous cells 42 is the shape of the nucleoli 78. According to one embodiment, a physical characteristic of the nucleoli 78 within the nucleus 76 that is used to identify repair cells 44 and distinguish repair cells 44 from cancerous cells 42 is the variation of size of the nucleoli 78 within the nucleus 76. According to another embodiment, a physical characteristic of the nucleoli 78 within the nucleus 76 that is used to identify repair cells 44 and distinguish repair cells 44 from cancerous cells 42 is the texture of the nucleoli 78 and/or nucleus 76. In a further embodiment, a physical characteristic of the nucleoli 78 and/or nucleus 76 that is used to identify repair cells 44 and distinguish repair cells 44 from cancerous cells 42 is the variation of gray value of the pixel within the nucleoli 78. Persons skilled in the art will appreciate that other physical characteristics can be utilized, and that shape, size, texture and gray value are exemplary characteristics that can be used with embodiments.

In addition to considering physical characteristics individually, two physical characteristics, three characteristics, or all of the physical characteristics can be considered. For example, a determination whether a nucleus 76 is part of a cancerous cell 42 can be based on a combination of shape and size, shape and texture, shape and transmittance, size and texture, size and transmittance and shape and transmittance. Further, a determination whether a nucleus 76 is part of a cancerous cell 42 or a non-cancerous repair cell 44 can be based on three different physical characteristics, e.g., shape, size and texture, shape, size and transmittance, size, texture and transmittance, texture shape and size, etc. Further, all four of the exemplary physical characteristics can be utilized.

Figure 12:
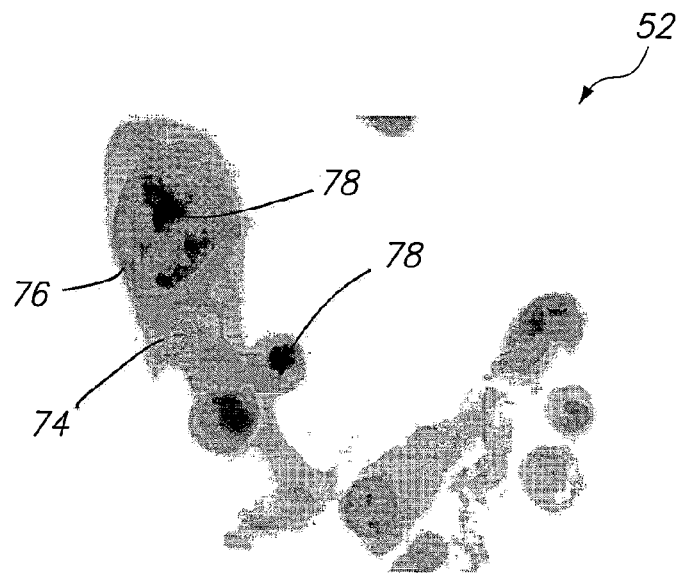
FIG. 12 is an image illustrating different physical properties of cancer cells compared to normally dividing, non-cancerous cells.

The use of physical characteristics (and nuclear statistical analysis if necessary) to distinguish repair cells 44 and cancer cells 42 is shown with reference to FIGS. 8 and 12. As shown in FIGS. 8 and 12, nucleoli 78 within cancer cells 42 have an irregular shape or border whereas nucleoli 78 within repair cells 44 have consistent or smooth shaped borders. As a further example, nucleoli 78 within cancer cells 42 are highly textured, whereas nucleoli 78 within repair cells 44 are not. Additionally, the sizes of nucleoli 78 components in cancer cells 42 can vary, whereas nucleoli 78 components of repair cells 44 are smaller and more consistent in size.

Spectral analysis 62 and physical characteristic analysis can be applied to the entire image or portions or regions of the image, which can be various shapes and sizes. According to one embodiment, referring to FIG. 13, a method 1300 of processing an image of a specimen includes analyzing individual fields of view. The method 1300 includes selecting a plurality of fields of view in step 1305. According to one embodiment, each field of view is processed individually so that in step 1310, one of the fields of views is selected. In step 1315, pixels of the selected field of view are classified as a component, e.g., background, cytoplasm, nucleus and nucleoli components. In step 1320, pixel regions that correspond to components, such as nucleolus components, that are used to differentiate repair and cancer cells, are selected, and in step 1325, a determination is made whether a nucleus corresponding to the selected pixels is a repair cell or a cancer cell.

In a further alternative embodiment, statistical analysis of a nucleus 76 can be performed independently or in combination with analysis of physical characteristics of nucleoli 78 to determine whether a given nucleus 76 is part of a cancer cell 42 or a repair cell 44. Statistical analysis of nucleus 76 may involve determining the number of nucleoli 78 within a nucleus 76. Cancer cells 42 and repair cells 44 can be differentiated based on a nucleus 76 of a cancer cell 42 having more than one nucleolus 78, whereas a nucleus 76 of a repair cell 44 typically has one or two distinguishable nucleoli 78. Statistical analysis of nucleus 76 may also involve determining the degree to which the size of nucleoli 78 vary, the mean size of nucleoli 78, standard deviation of the size of nucleoli 78, the largest nucleoli 78, the smallest nucleoli 78, the darkest nucleoli 78, the lightest nucleoli 78 and posterior probability of whether this nucleolus belongs to a cancerous nucleus.

Figure 13:
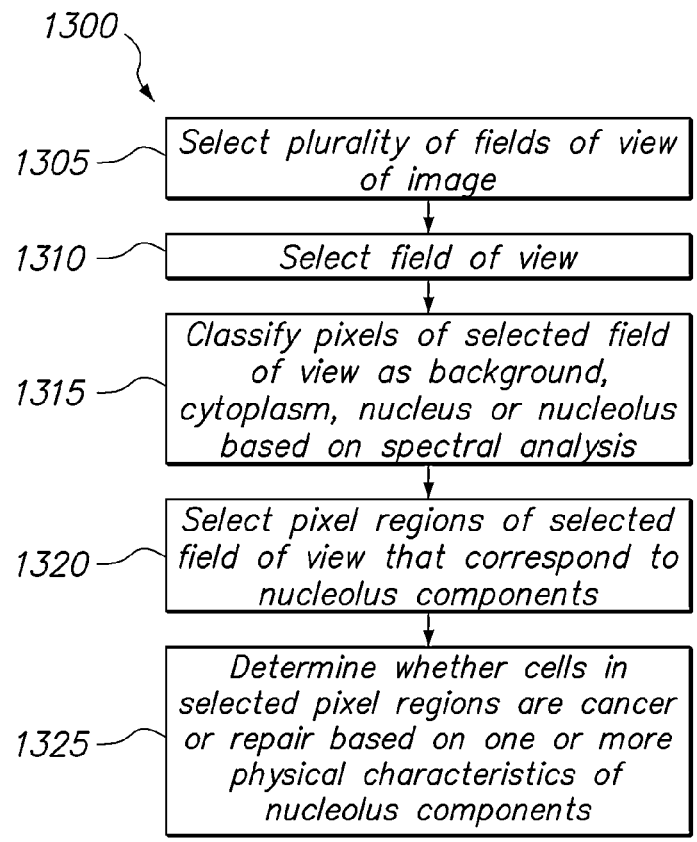
FIG. 13 is a flow chart a method of processing an image of a biological specimen involving analysis of spectral and physical characteristics according to another embodiment.
Figure 14:
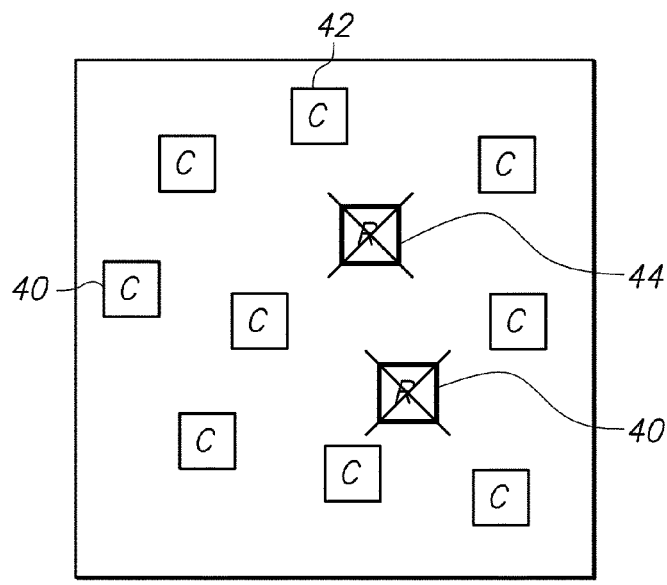
FIG. 14 generally illustrates identification and rejection of repair cells so that a field of view including repair cells is not selected for further review and analysis.

Referring to FIG. 14, identified repair cells 44 can be rejected and eliminated from further consideration so that they do not outrank and exclude other possibly more relevant cells from further review by a cytotechnologist after repair cells 44 are identified using spectral analysis 52 and analysis of suitable physical characteristics (and statistical analysis of nucleus 76 as necessary). In the illustrated example, FIG. 13 illustrates 11 fields of view 40. Two fields of view 40 include repair cells 44, which were erroneously identified as being pre-malignant or malignant cells or cell clusters as a result of having dividing nuclear components similar to cancer cells 42. Embodiments address these shortcomings by using spectral analysis 62 and analysis of physical characteristics to reliably identify repair cells 44 and reject the identified repair cells 44, as indicated by an "X" through the repair cell "R" fields of view 40 that were initially identified. New fields of view 40 can then be selected to replace the rejected fields of view 40. Thus, embodiments advantageously maximize the number of fields of view 40 that include cells that most likely have attributes consistent with malignant or pre-malignant cells.

In the embodiment shown in FIG. 14, the imager has selected an initial set of fields of view 40. Fields of view including repair cells can be rejected and replaced with other fields of view 40. Thus, rejecting and replacing a repair cell field of view occurs after the imager has already selected a set of fields of view. In an alternative embodiment, physical characteristic analyses can be performed while images are being acquired or before an initial set of fields of view is generated so that the fields of view that are eventually generated already incorporate the results of spectral and physical characteristic analysis. Thus, in these embodiments, it may not be necessary to subsequently identify fields of view having repair cells 44 and replace the identified fields of view with other fields of view at a later time since the repair cells 44 were identified and rejected during image acquisition or prior to generation of the fields of view.

FIGS. 15-21 illustrate other embodiments directed to identifying repair cells 44 by comparing transmittance of light through nucleus components of selected cells or pixels and transmittance of light through nucleus components of other cells in order to determine whether the cells under examination are repair cells 44 or cancer cells 42. Thus, while embodiments described with reference to FIGS. 4-14 can be implemented by examining transmittance of light through subnuclear nucleolus 78 components, alternative embodiments can be implemented by examining transmittance of light through nucleus 76 components.

Figure 15:
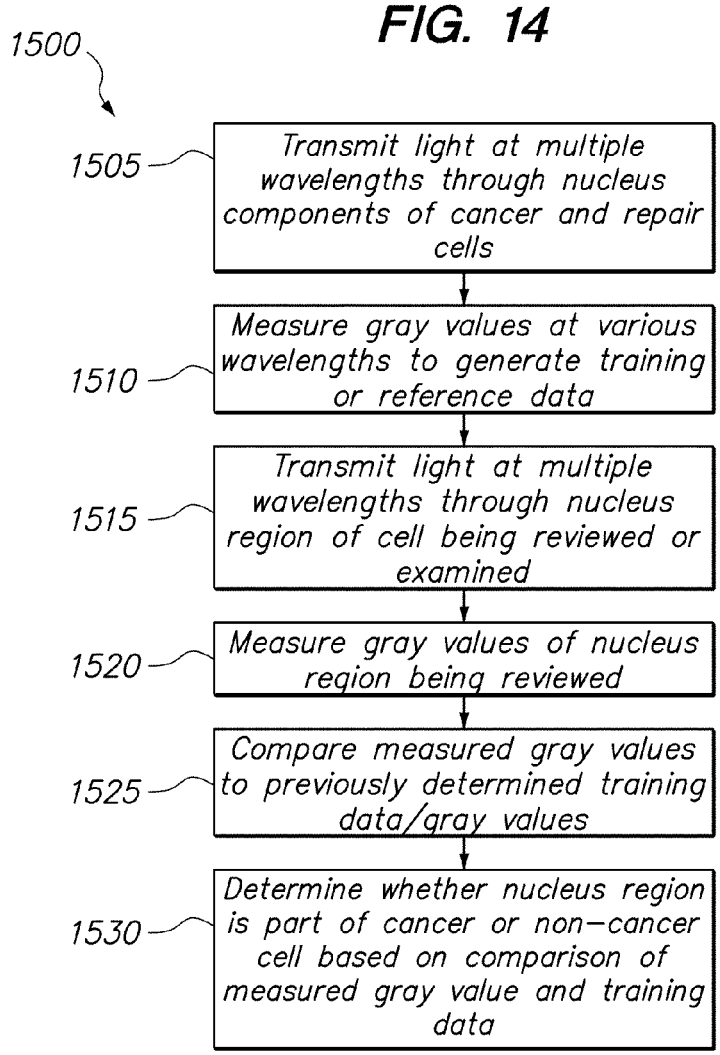
FIG. 15 is a flow chart showing a method of processing an image of a biological specimen based on transmission characteristics according to another embodiment.

Referring to FIG. 15, a method 1500 for classifying a nucleus as a cancer cell or repair cell according to an alternative embodiment includes transmitting light at multiple wavelengths through a region, e.g., a group of pixels, of nucleus components of cancer and repair cells in step 1505. In step 1510, gray values of the nucleus regions are measured at the various wavelengths in order to generate a set of training or reference data that includes gray values of nucleus components of cancer cells and gray values of nucleus components of repair cells. Subsequent gray value measurements of nucleus components of cells that are being reviewed can be compared against the training data.

After training data is acquired, in step 1515, light at multiple wavelengths is transmitted through a nucleus region of a cell that is being reviewed or examined. In step 1520, the gray values of the nucleus region being reviewed are determined. In step 1525, the measured gray values are compared to the previously determined training data/gray values.

Then, in step 1530, a determination is made whether the nucleus region being reviewed is part of cancerous or non-cancerous cell based on the comparison of the measured gray values and the training data. Persons skilled in the art will appreciate that although embodiments are described with reference to transmittance and gray values, other methods can also used. Thus, references to transmission characteristics are provided for purposes of illustration and explanation since absorption characteristics and profiles can also be utilized.

Figure 16:
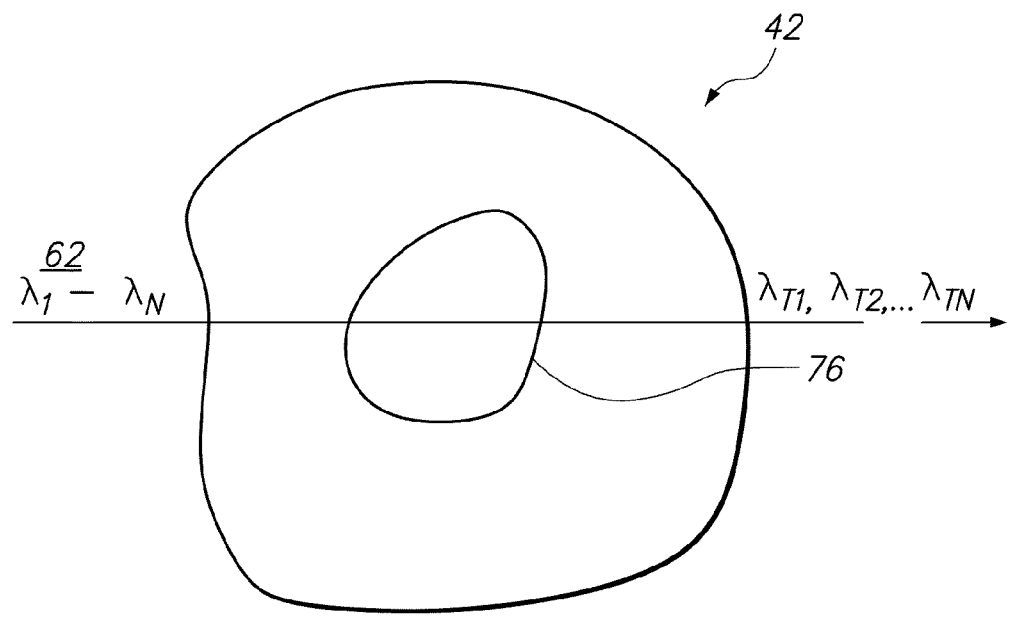
FIG. 16 generally illustrates determining gray values at different wavelengths of light transmitted through a nucleus of a cancer cell.
Figure 17:
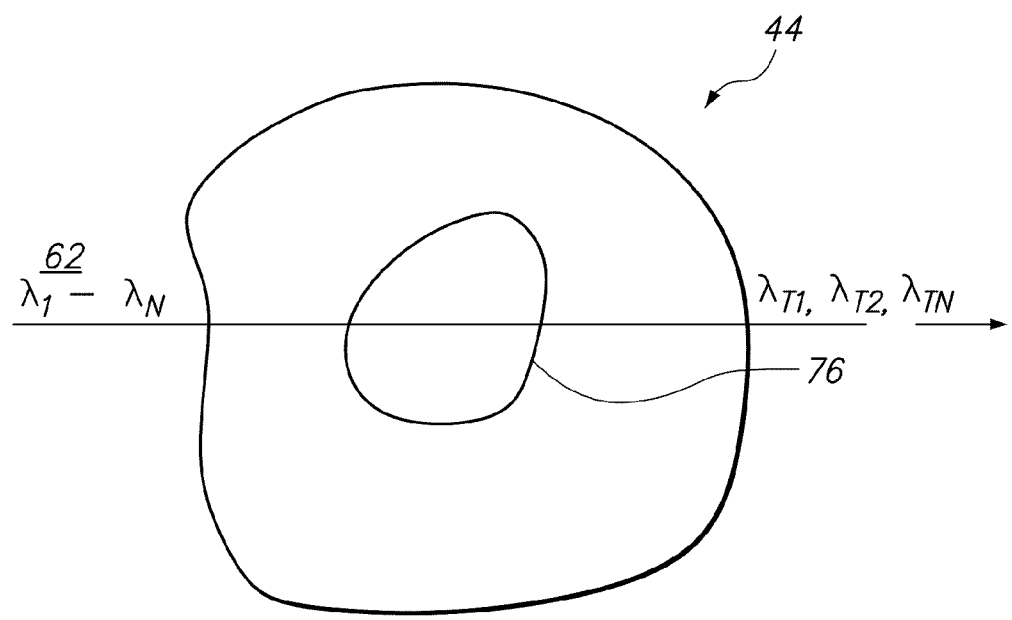
FIG. 17 generally illustrates determining gray values at different wavelengths of light transmitted through a nucleus of a regularly dividing repair cell.

Referring to FIGS. 16 and 17, according to one embodiment, transmittance of light through the cancer cells 42 and repair cells 44 is determined by spectral analysis 62 of nucleus 76 components. For this purpose, nucleus 76 components can be segmented from other portions of an image or a field of view, e.g., by using DVC segmentation or other segmentation methods. As shown in FIG. 16, light at a first wavelength is passed through a nucleus 76 of a cancer cell 42, light at a second wavelength is passed through a nucleus 76 of a cancer cell 42, and so on for as many wavelengths as necessary in order to determine transmission characteristics of cancer cells 42. Similarly, referring to FIG. 17, light at a first wavelength is passed through a nucleus 76 of a repair cell 44, light at a second wavelength is passed through a nucleus 76 of a repair cell 44, and so on for as many wavelengths as necessary in order to determine transmission characteristics of repair cells 44.

According to one embodiment, light at about three to about 30 different wavelengths ranging from about 400 nm to about 720 nm is utilized to determine transmission characteristics of cancer cells 42 and repair cells 44. Other wavelengths and other numbers of wavelengths can be utilized. In one test, a collection of about 2,000 spectral data points representing segmented repair cells 44 was use to determine transmission characteristics of repair cells 44 using wavelengths ranging from 400 nm to 720 nm. A collection of about 3,000 spectral data points representing segmented cancer cells 42 was used to determine transmission characteristics of cancer cells 42 using these same wavelengths. Referring to FIG. 18, a transmission profile 180 or collection of gray values of cancer cells 42 at various wavelengths and a transmission profile 182 of gray values of repair cells 44 at various wavelengths can be generated based on the transmission of light at various wavelengths through cancer cells 42 and repair cells 44 as shown in FIGS. 16 and 17.

Figure 19:
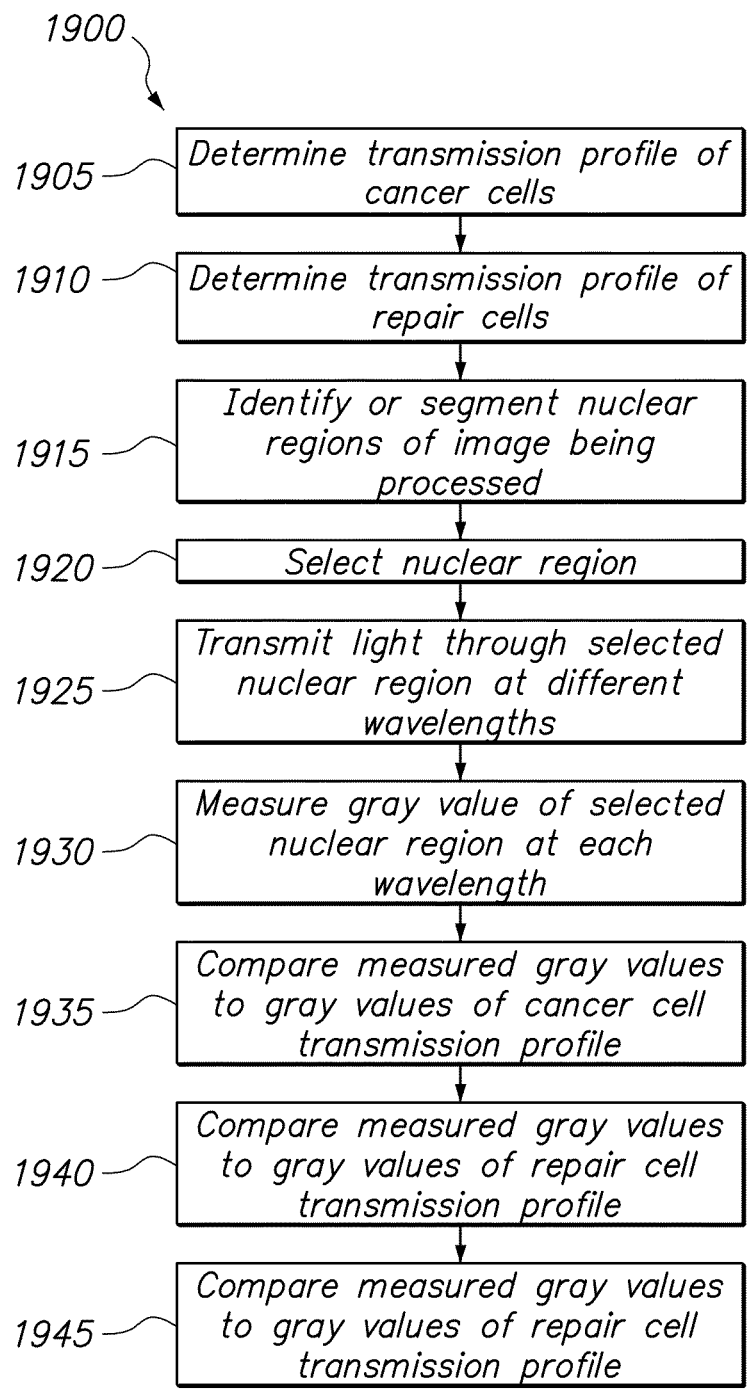
FIG. 19 is a flow chart of a method of processing an image of a biological specimen based on transmission characteristics according to another embodiment.

Referring to FIGS. 19 and 20, in one embodiment, a method 1900 of using transmittance comparisons to distinguish cancer cells 42 and repair cells 44 includes determining a transmission profile 180 of cancer cells by quantifying the transmitted light through nuclear regions of the cancer cells at various wavelengths and measuring gray values of the nuclear regions at the various wavelengths in step 1905. In step 1910, a transmission profile 182 of repair cells is determined by quantifying the transmitted light through nuclear regions of repair cells at various numbers of wavelengths and measuring the gray values at the various wavelengths, e.g., the same wavelengths used in step 1905 to allow direct comparisons. In step 1915, nuclear regions of an image being processed can be segmented or identified. In step 1920, a nuclear region is selected, and in step 1925, light at different wavelengths is transmitted through the selected nuclear region. For example, the wavelengths in step 1925 can be the wavelengths that were used to generate the transmission profiles 180 and 182.

In step 1930, the gray value of the selected nuclear region at each wavelength is measured. The collection of measured gray values is represented by measured gray value data 200 in FIG. 20. In step 1935, the measured gray values 200 are compared to the gray values of the cancer cell transmission profile 180. Further, in step 1940, the measured gray values 200 are compared to the gray values of the repair cell transmission profile. In step 1945, a determination is made whether a measured gray value at a given wavelength matches or is more similar or closer to a gray value of cancer cell profile or a repair cell profile at that wavelength. The results of the determinations in step 1945 are shown as data 202. One manner in which step 1945 can be carried out is described below.

Each pixel within the nucleus is represented by a feature vector. Each feature vector is composed of n different gray values and n different optical density values, where "n" is equal to the number of different wavelength of light being used. Optical density is the log transformation of the gray values. For example, if a nucleus has 150 pixels, then each feature vector has 2×n feature values and each nucleus is represented by 150 feature vectors. These feature vectors are then compared to the training data. The linear discriminant functions are computed from the training data. The training data is composed of a large number of feature vectors that are pre-calculated from the cancerous nuclei and repair nuclei.

A Posterior Probability of being Cancer (PPC) is calculated for each feature vector during the linear discriminant analysis. A Posterior Probability of being Repair (PPR) is calculated for each feature vector during the linear discriminant analysis. The average PPC and the average PPR of all the feature vectors that belong to the same nucleus are computed. If the average PPC is greater than the average PPR, then this nucleus is classified as cancer. The cell that contains this nucleus is a cancer cell.

Similar to the embodiments shown in FIGS. 4-14, embodiments shown in FIGS. 14-20 can be implemented before or after an initial set of fields of view is generated by an imager. Thus, embodiments are described with reference to an imager that has selected an initial set of fields of view 40. If certain fields of view include repair cells, ten they are rejected and replaced with other fields of review. Thus, the repair cell rejection and replacement occurs after the imager has already selected a set of fields of view. In an alternative embodiment, spectral transmission characteristics can be considered while images are being acquired or before an initial set of fields of view is generated so that the fields of view that are eventually generated already incorporate the results of transmittance comparisons. Thus, in these embodiments, it may not be necessary to subsequently identify fields of view having repair cells and replace the identified fields of view with other fields of view at a later time since the repair cells were identified and rejected during image acquisition or prior to generation of the fields of view.

In a further alternative embodiment, the method described with reference to FIGS. 14-21 based on measured gray values and transmission profiles can be combined with aspects of the method described with reference to FIGS. 4-14. For example, in order to supplement and/or confirm the conclusions reached with transmittance testing (FIG. 14-20), alternative embodiments also analyze physical characteristics of nuclear components to provide further information to reliably identify cells or cell clusters as repair or cancer cells. Thus, for example, physical characteristics of shape, size and texture can be used in combination with transmittance testing as necessary.

In yet another alternative embodiment, the method described with reference to FIG. 21 based on measured gray values and optical densities and transmission and optical density profiles can be combined with aspects of the method described with reference to FIGS. 4-14.

In the embodiment illustrated and described with reference to FIGS. 14-21, transmittance measurements and comparisons are performed without reference to physical characteristics of nuclear components. In an alternative embodiment, embodiments described with reference to FIGS. 14-21 can be combined with embodiments described with reference to FIGS. 4-14. Thus, in addition to transmittance measurements and comparisons, physical characteristics of nucleus can be considered to provide additional information for distinguishing repair cells and cancerous cells.

Figure 1:
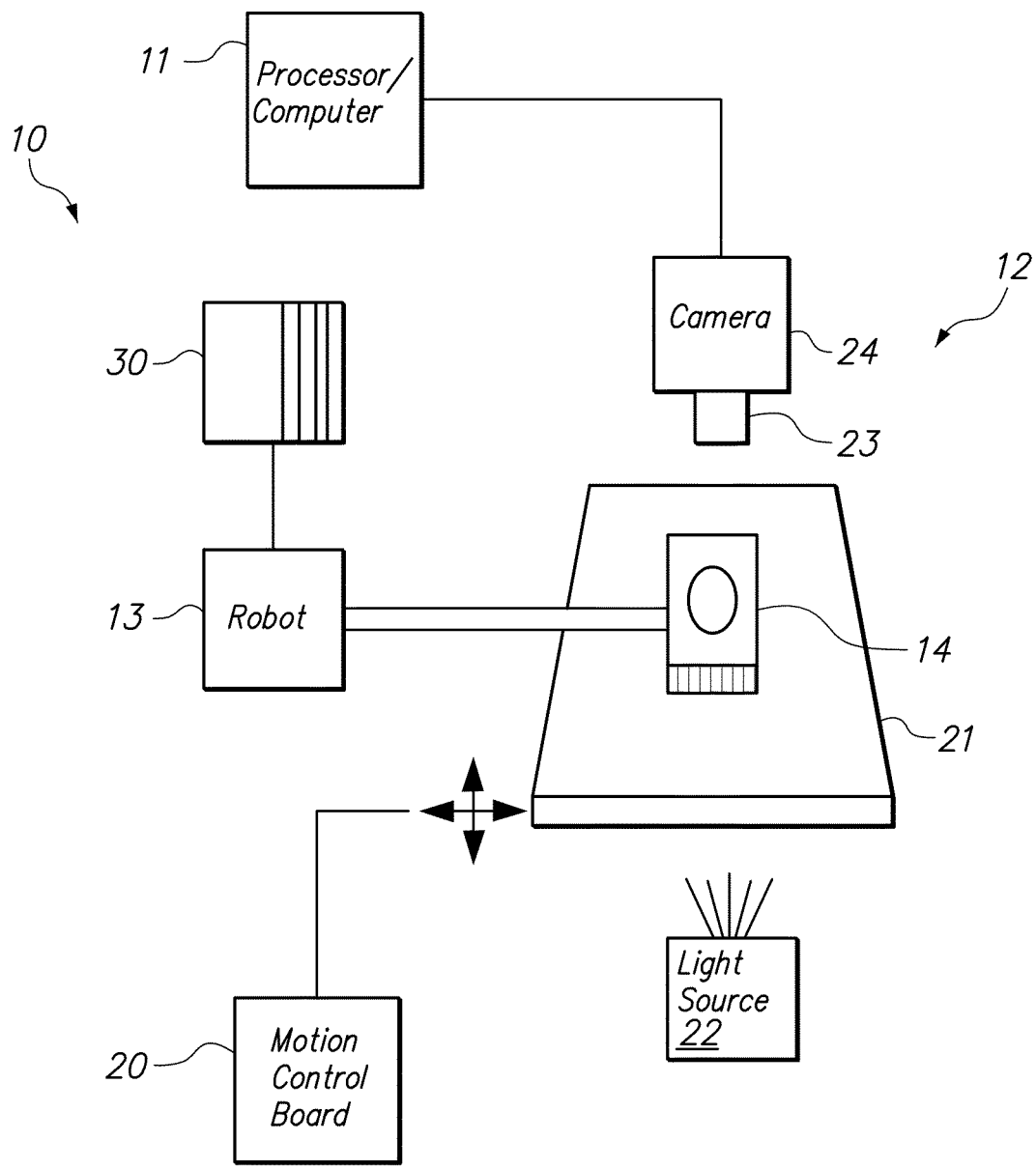
FIG. 1 illustrates a known specimen slide imaging system.
Figure 2:
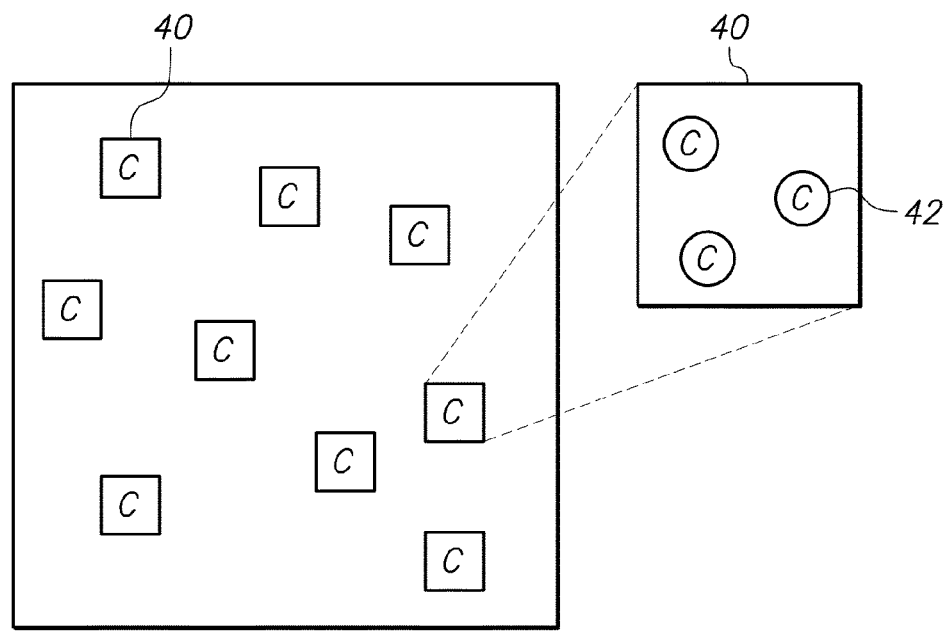
FIG. 2 generally illustrates fields of view including cells identified as having attributes consistent with malignant or pre-malignant cells.
Figure 3:
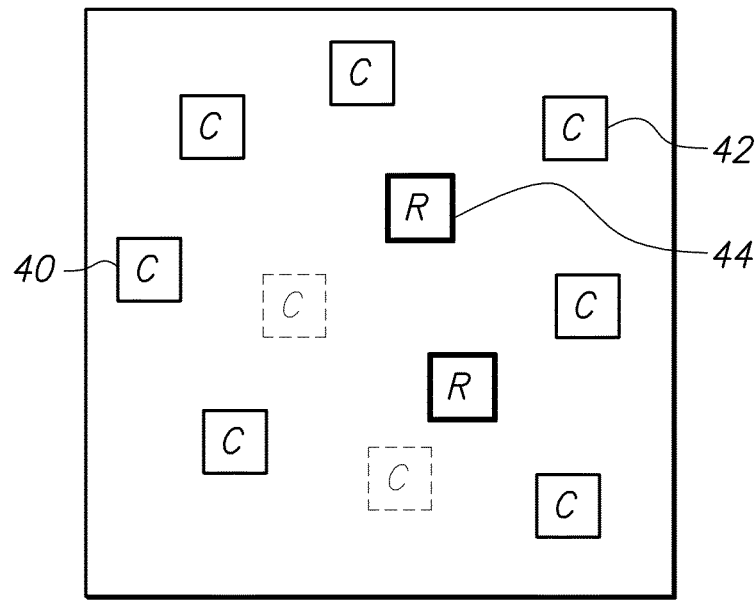
FIG. 3 generally illustrates fields of view including normally dividing cells and that are selected to the exclusion of other fields of view that may include cells having attributes consistent with malignant or pre-malignant cells.

In various embodiments of the invention, a substantial number of artifacts or false alarm cells can be reliably identified and rejected so that they are not selected for further review and analysis. Various embodiments can also enable new types of imagers involving slide sorting and diagnosis, and can be implemented within an imager or using a separate system. Thus, for example, a processor of the imager, such as processor 11 of imager 10 shown in FIG. 1, can be configured or programmed to execute embodiments. Alternatively, a separate processor, e.g., a separate computer that is not part of the imager, can be used to execute embodiments. Embodiments of the invention can be implemented in various imaging systems, including but not limited to the Thinprep Imaging System manufactured and distributed by Cytyc Corporation.

Figure 22:
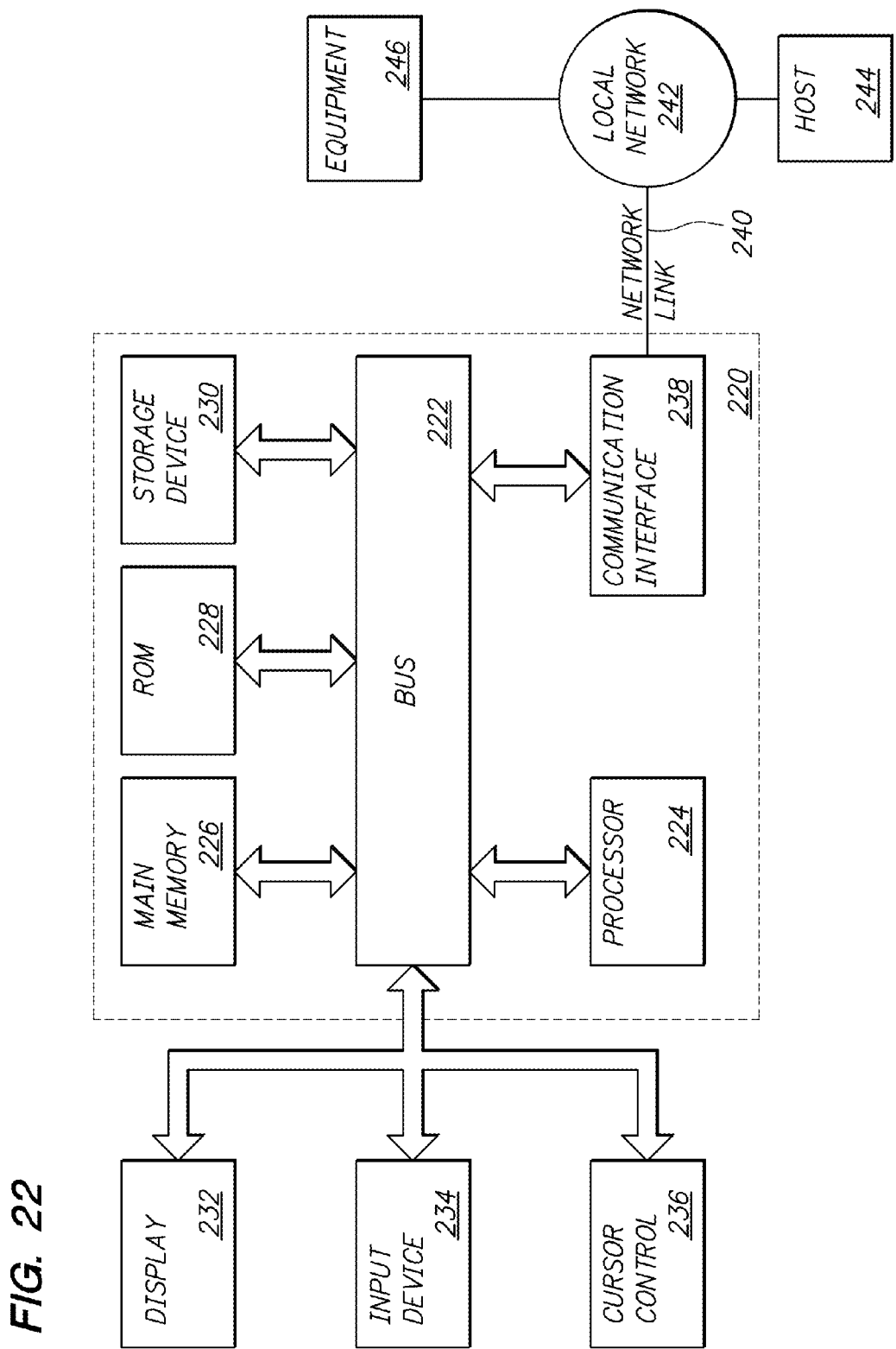
FIG. 22 illustrates a diagram of a computer hardware system that can be used to perform various functions described herein in accordance with some embodiments.

FIG. 22 illustrates an exemplary known computer architecture that can be used to implement embodiments. One or more instructions can be imported into a computer to enable the computer to perform any of the functions described herein. FIG. 22 is a block diagram that illustrates an exemplary computer system 220 that includes a bus 222 or other communication mechanism for communicating information, and a processor 224 coupled with bus 222 for processing information. Computer system 220 also includes a main memory 226, such as a random access memory (RAM) or other dynamic storage device, coupled to bus 222 for storing information and instructions to be executed by processor 224. Main memory 226 also may be used for storing temporary variables or other intermediate information during execution of instructions to be executed by processor 224. Computer system 220 may further include a read only memory (ROM) 228 or other static storage device(s) coupled to bus 222 for storing static information and instructions for processor 224. A data storage device 230, such as a magnetic disk or optical disk, is provided and coupled to bus 222 for storing information and instructions.

Computer system 220 may be coupled via bus 222 to a display 232, such as a cathode ray tube (CRT), for displaying information to a user. An input device 234, including alphanumeric and other keys, is coupled to bus 222 for communicating information and command selections to processor 224. Another type of user input device is cursor control 236, such as a mouse, a trackball, cursor direction keys, or the like, for communicating direction information and command selections to processor 224 and for controlling cursor movement on display 232. This input device typically has two degrees of freedom in two axes, a first axis (e.g., x) and a second axis (e.g., y), that allows the device to specify positions in a plane.

Embodiments of the invention described herein are related to the use of computer system 220 for processing electronic data, and/or controlling an operation of the slide preparation machine 12. According to some embodiments, such use may be provided by computer system 220 in response to processor 224 executing one or more sequences of one or more instructions contained in the main memory 206. Such instructions may be read into main memory 226 from another computer-readable medium, such as storage device 230. Execution of the sequences of instructions contained in main memory 226 causes processor 224 to perform the process steps described herein. One or more processors in a multi-processing arrangement may also be employed to execute the sequences of instructions contained in main memory 226. In alternative embodiments, hard-wired circuitry may be used in place of or in combination with software instructions to implement various operations/functions described herein. Thus, embodiments of the invention are not limited to any specific combination of hardware circuitry and software.

The term "computer-readable medium" as used herein refers to any medium that participates in providing instructions to processor 224 for execution. Such a medium may take many forms, including but not limited to, non-volatile media, volatile media, and transmission media. Non-volatile media includes, for example, optical or magnetic disks, such as storage device 230. Volatile media includes dynamic memory, such as main memory 226. Transmission media includes coaxial cables, copper wire and fiber optics, including the wires that comprise bus 222. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 224 for execution. For example, the instructions may initially be carried on a magnetic disk of a remote computer. The remote computer can load the instructions into its dynamic memory and send the instructions over a telephone line using a modem. A modem local to computer system 220 can receive the data on the telephone line and use an infrared transmitter to convert the data to an infrared signal. An infrared detector coupled to bus 222 can receive the data carried in the infrared signal and place the data on bus 222. Bus 222 carries the data to main memory 226, from which processor 224 retrieves and executes the instructions. The instructions received by main memory 226 may optionally be stored on storage device 230 either before or after execution by processor 224.

Computer system 220 also includes a communication interface 218 coupled to bus 222. Communication interface 238 provides a two-way data communication coupling to a network link 240 that is connected to a local network 242. For example, communication interface 238 may be an integrated services digital network (ISDN) card or a modem to provide a data communication connection to a corresponding type of telephone line. As another example, communication interface 238 may be a local area network (LAN) card to provide a data communication connection to a compatible LAN. Wireless links may also be implemented. In any such implementation, communication interface 218 sends and receives electrical, electromagnetic or optical signals that carry data streams representing various types of information.

Network link 240 typically provides data communication through one or more networks to other devices. For example, network link 240 may provide a connection through local network 242 to a host computer 244. Network link 240 may also transmits data between an equipment 246 and communication interface 238. The data streams transported over the network link 240 can comprise electrical, electromagnetic or optical signals. The signals through the various networks and the signals on network link 240 and through communication interface 238, which carry data to and from computer system 220, are exemplary forms of carrier waves transporting the information. Computer system 220 can send messages and receive data, including program code, through the network(s), network link 240, and communication interface 238. Although one network link 240 is shown, in alternative embodiments, communication interface 238 can provide coupling to a plurality of network links, each of which connected to one or more local networks. In some embodiments, computer system 220 may receive data from one network, and transmit the data to another network. Computer system 220 may process and/or modify the data before transmitting it to another network.

Although particular embodiments have been shown and described, it should be understood that the above discussion is intended to be illustrative and not limiting, and various changes and modifications may be made without departing from the scope of embodiments or of the invention. For example, persons skilled in the art will appreciate that various types of regularly dividing cells, including repair cells, can be identified, distinguished from pre-malignant or malignant cells, and rejected to prevent the normal cells from being selected for further review and analysis. Further, persons skilled in the art will appreciate that embodiments can be applied to portions of or all of an image. Additionally, different numbers of wavelengths can be utilized as necessary. Moreover, persons skilled in the art will appreciate that although the flow charts and description show and describe a method involving a certain order of steps, steps can be performed in different orders to achieve the same result.

What is claimed is:

1. A method of processing an image of a biological specimen, the specimen having a plurality of cells, the method comprising:
   identifying nucleoli of the cells of the biological specimen in the image based on spectral characteristics of the nucleoli;
   and
   using a processor to evaluate one or more physical characteristics of the nucleoli in order to determine whether cells having the nucleoli have a likelihood of being cancerous or non-cancerous.

2. The method of claim 1, wherein the nucleoli of the cells of the specimen are identified using one or more light wavelengths in a range from about 400 nm to about 720 nm.

3. The method of claim 1, wherein identifying the nucleoli of the cells of the specimen comprises classifying a pixel of the image as a nucleolus of a cell of the biological specimen based on spectral characteristics of the pixel.

4. The method of claim 1, further comprising determining whether cells corresponding to the nucleoli are cancer cells or normal repair cells.

5. The method of claim 1, wherein the determination of whether cells having the nucleoli have a likelihood of being cancerous or non-cancerous is based on a shape of the nucleoli.

6. The method of claim 1, wherein the determination of whether cells having the nucleoli have a likelihood of being cancerous or non-cancerous is based on a texture of the nucleoli.

7. The method of claim 1, wherein the determination of whether cells having the nucleoli have a likelihood of being cancerous or non-cancerous is based on a size of the nucleoli.

8. The method of claim 1, wherein the determination of whether cells having the nucleoli have a likelihood of being cancerous or non-cancerous is based on a transmittance or gray value of the nucleoli or of an image pixel of the nucleoli.

9. A system for processing an image of a biological specimen having a plurality of cells, comprising:
   an imager having a processor configured to identify nucleoli of the cells of the biological specimen in the image based on spectral characteristics of the nucleoli, and evaluate one or more physical characteristics of the nucleoli in order to determine whether cells in the image having the nucleoli are cancerous or non-cancerous.

10. The system of claim 9, wherein the nucleoli of the cells of the specimen are identified using one or more light wavelengths in a range from about 400 nm to about 720 nm, the system comprising a source or sources of the one or more light wavelengths.

11. The system of claim 9, wherein the processor identifies the nucleoli of the cells of the specimen based on classifying a pixel of the image as a nucleolus of a cell of the biological specimen based on spectral characteristics of the pixel.

12. The system of claim 9, the processor further configured to determine whether cells corresponding to the nucleoli are cancer cells or normal repair cells based on one or more of a shape, a texture, a size and a transmittance of the nucleoli.

* * * * *